3,329,711
PHENYLALANINE COMPOUNDS HAVING ALPHA
AND BETA QUATERNARY CARBON ATOMS
Balthasar Hegedüs, Binningen, and Paul Zeller, Allschwil,
  Switzerland, assignors to Hoffmann-La Roche Inc., Nutley, N.J., a corporation of New Jersey
No Drawing. Filed Dec. 3, 1964, Ser. No. 415,798
Claims priority, application Switzerland, Dec. 24, 1963,
15,905/63
9 Claims. (Cl. 260—519)

The present invention relates to pharmaceutically useful compounds, and intermediates and processes therefor. More particularly, the present invention relates to phenylalanine compounds characterized in that both the α and β carbon atoms of the alanine moiety are quaternary. More particularly, the novel, pharmaceutically useful phenylalanine compounds of this invention are of the formula

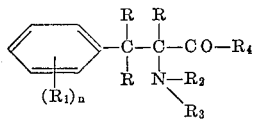
    I wherein each R is lower alkyl, $R_1$ is selected from the group consisting of hydroxy, lower alkanoyloxy and benzoyloxy, $n$ is a whole integer from 1 to 3; $R_2$ is selected from the group consisting of hydrogen, lower alkyl, lower alkanoyl and benzoyl; $R_3$ is selected from the group consisting of hydrogen and lower alkyl; and $R_4$ is selected from the group consisting of hydroxy, lower alkoxy, phenyl-lower alkoxy and amino.

Also within the scope of this invention are acid addition salts of the compounds of Formula I.

As used herein, the term "lower alkyl" comprehends both branched and straight chain saturated hydrocarbon moieties such as methyl, ethyl, propyl, and isopropyl. The lower alkyl groups denoted by R preferably contain from 1 to 3 carbon atoms (methyl is especially preferred). Each of the three substituents denoted by the symbol R can be the same alkyl group or different alkyl groups. With respect to the hydroxy and esterified hydroxy moieties denoted by the symbol $R_1$, it is especially preferred if these are located in the 3,4- and/or 5-position of the phenyl ring. Particularly preferred compounds are those wherein $n$ is 2, and $R_1$ represents free hydroxy groups located in the 3- and 4-position. Such compounds show particularly advantageous properties. Also, preferred are those compounds which contain a free α-amino group (i.e., $R_2$ and $R_3$ are both hydrogen). However, the α-amino group and the aromatic hydroxy substituents can be acylated or esterified, respectively, (i.e., $R_1$ can be lower alkanoyloxy or benozyloxy and $R_2$ can be lower alkanoyl or benzoyl) with, for example, lower alkanoic acids (such as acetic acid) or with aromatic carboxylic acids (such as benzoic acid). Also, the phenylalanine derivatives can be free acids (i.e., $R_4$ is hydroxy), as esters with lower alkanols (i.e., $R_4$ is lower alkoxy, such as methoxy or ethoxy), as esters with phenyl-lower alkanols (such as benzyloxy), or as amides (i.e., $R_4$ is amino). The term "lower alkanoyl" refers to the acid residue of lower alkanoic acids, for example, acetyl, propionyl, or the like.

Representative compounds of the invention within the scope of Formula I are for example, α,β,β-Trimethyl-β-(3,4-dihydroxy-phenyl)-alanine
α,β,β-Trimethyl-β-(3,4-dihydroxy-phenyl)-alanine ethyl ester
α,β,β-Trimethyl-β-(3,4-dihydroxy-phenyl)-alanine amide
α,β,β-Triethyl-β-(3,4-dihydroxy-phenyl)-alanine
α-Methyl-β,β-diethyl-β-(3,4-dihydroxy-phenyl)-alanine
α-Isopropyl-β,β-dimethyl-β-(3,4-dihydroxy-phenyl)-alanine
α,β,β-Trimethyl-β-(3,4,5-trihydroxy-phenyl)-alanine.

As indicated above, the basic compounds of this invention form acid addition salts. More particularly, they form pharmaceutically acceptable acid addition salts with both organic and inorganic acids; for example, with pharmaceutically acceptable acids such as the hydrohalic acids (e.g., hydrochloric acid, hydrobromic acid), nitric acid, phosphoric acid, sulfuric acid, acetic acid, formic acid, succinic acid, maleic acid, p-toluene-sulfonic acid, methanesulfonic acid, and the like. Acid addition salts which are not pharmaceutically acceptable can be converted to pharmaceutically acceptable acid addition salts either by simple exchange reactions or by neutralization to the free base followed by reaction with the desired pharmaceutically acceptable acid.

Compounds of Formula I wherein $R_1$ represents free hydroxy groups can be prepared from corresponding compounds of the same formula wherein $R_1$ represents lower alkoxy groups. These etherified groups can be cleaved in a manner known per se. Thus, the lower alkoxy groups can be converted into hydroxy groups, for example, by warming with hydrohalic acids (especially suitable is the use of 48 percent hydrobromic acid). These intermediates of Formula I wherein $R_1$ is lower alkoxy, as well as acid addition salts thereof, are within the scope of this invention.

Subsequent esterification of free hydroxy groups to obtain compounds of Formula I wherein $R_1$ represents lower alkanoyloxy or benzyloxy, or acylation of the α-amino group to obtain compounds wherein $R_2$ is lower alkanoyl or benzoyl, can be effected according to conventional esterification or acylation means, for example, by treatment with a reactive derivative of a lower alkanoic or benzoic acid, for example, an acid halide or an acid anhydride, preferably in the presence of a tertiary base, such as, for example, pyridine. Preferred esterification/acylation agents are acid chlorides and acid anhydrides. Compounds bearing an acylated α-amino group and free aromatic hydroxy groups can be obtained by acylating prior to ether cleavage. If the ether cleavage is performed prior to acylation, then the acylation conditions can bring about concurrent esterification.

Under certain conditions the acylation yields an oxazine intermediate of the formula

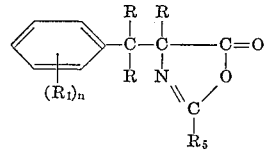
    II wherein each of R and $n$ have the same meaning as above; $R_1$ is selected from the group consisting of hydroxy, lower alkoxy, lower alkanoyloxy and benzoyloxy; and $R_5$ is selected from the group consisting of lower alkyl and phenyl.

The compounds of Formula II can be hydrolyzed to obtain the desired N-acyl product of Formula I. These intermediates of Formula II are within the scope of this invention.

The α-amino group of the alanine moiety can be alkylated by conventional alkylation means, for example, by treatment with an alkyl halide in the presence of a tertiary organic base (e.g., in the presence of pyridine or triethyl amine). The alkylation of the amino group can also be effected by reduction of corresponding N-acylated amines. Thus, by hydrogenation of a mixture of a compound containing a primary amino group as the α-amino substituent and formaldehyde (preferably a formalin solution), in the presence of a noble-metal catalyst, dimethylamino substituted derivatives can be obtained.

Carbalkoxy groups present in the alanine moiety can be saponified by conventional means, and free carboxylic groups can be esterified or amidated. The esterification with a lower alkanol is conveniently effected in the presence of an acid catalyst (e.g., in the presence of hydrogen chloride, p-toluene-sulfonic acid, sulfinyl chloride, or thionyl chloride).

The present invention also comprehends the optical isomers of the novel phenylalanine compounds, as well as their preparation. The racemates obtained after carrying out the reactions leading to the desired phenylalanine of Formula I can be separated into optically active forms, for example, in the form of an ester and/or amide with an optically active acid such as tartaric acid. Moreover, racemic N-acyl-amino compounds of Formula I can be separated into their stereoisomers via the formation of their salts with optically active bases (e.g., with quinine or brucine).

The phenylalanine compounds of this invention are readily soluble in water and, due to their amphoteric character, are also readily soluble in acids and alkalis. Their purification from inorganic impurities is best carried out by means of weakly basic and weakly acidic ion-exchange resins.

Compounds of Formula I above wherein $R_1$ represents lower alkoxy or hydroxy can be prepared via the hydrolytic cleavage of compounds of the formula

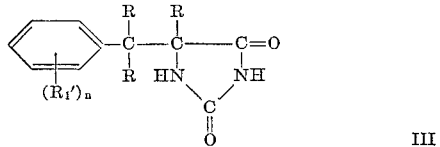

wherein $R_1'$ is lower alkoxy, and $n$ and R have the same meaning as above. The so-obtained reaction product is a compound of Formula I wherein $R_1$ is lower alkoxy or hydroxy. This reaction product, in optional sequence, can then be subjected, if necessary, to ether cleavage and, if desired, free hydroxy groups can be esterified, the free amino group can be alkylated or acylated, the carboxy group can be saponified, and the free carboxy group can be esterified or amidated.

The intermediate hydantoins of Formula III are a class of intermediates comprehended by this invention and can be prepared from ketones of the formula

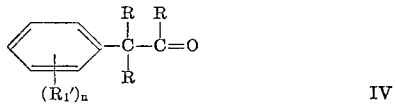

wherein $R_1'$, $n$ and R have the same meaning as above, by treatment thereof with a mixture of ammonium carbonate and an alkali cyanide in an aqueous lower alkanol. It is convenient to undertake this reaction under an atmosphere of carbon dioxide and at super-atmospheric pressure, whereby the yield can be increased. After the reaction has been effected, the alcohol which is present can be conveniently distilled off under reduced pressure, whereupon the desired hydantoin which has been formed precipitates out. The hydantoins can be purified by recrystallization (e.g., from an aqueous lower alkanol).

The hydantoins of Formula III can be hydrolytically cleaved, for example, with strong basic agents, whereby products of Formula I are obtained wherein the aromatic hydroxy groups are etherified as they were in the starting material hydantoin, i.e., aromatic lower alkoxy substituents present in the starting material hydantoin of Formula III are not affected by this hydrolytic cleavage of the hydantoin ring. Suitable basic agents are, for example, aqueous barium hydroxide solution or an aqueous alkali metal (e.g., sodium, potassium) hydroxide solution. The cleavage can be effected, for example, by heating the hydantoin at a temperature above about 150° C. and at a super-atmospheric pressure, or by heating the hydantoin starting material at atmospheric pressure to boiling under reflux conditions for a long time (e.g., from about 20 to 50 hours) with concentrated aqueous alkali metal hydroxide solutions (such as sodium or potassium hydroxide solution). In order to obtain a cleavage of the hydantoin ring which is as complete as possible, it is advisable to use the basic agent in a considerable excess (i.e., in an amount of about 4 to 6 times the molar quantity of hydantoin).

The above-described hydrolytic treatment of a hydantoin intermediate of Formula III leads to a mixture of the free acid (i.e., compounds in Formula I wherein $R_4$ is hydroxy) and its amide (i.e., compounds of Formula I wherein $R_4$ is amino). Both of these components, i.e., both the free acid and the amide can be isolated. The free acid which is less soluble in the aqueous reaction medium, can be separated after concentration of the reaction mixture. The amide, which is more readily soluble in the reaction mixture, can then be obtained from the mother liquor.

The hydantoin intermediates of Formula III can also be hydrolytically opened with simultaneous cleavage of the aromatic ether groups (i.e., the lower alkoxy substituents) by effecting the cleavage by treatment with strong acids. Hydrohalic acids (especially the constant boiling, approximately 48 percent hydrobromic acid) can be suitably used for this purpose. In this manner compounds of Formula I wherein $R_1$ is hydroxy can be directly obtained from hydantoin intermediates of Formula III wherein $R_1'$ is lower alkoxy.

The novel pharmaceutically useful products of this invention, i.e., the compounds of Formula I wherein $R_1$ is hydroxy, lower alkanoyloxy or benzoyloxy are useful as tryptophane hydroxylase inhibitors, and are useful as hypotensive agents. As indicated above, the free base or a pharmaceutically acceptable acid addition salt thereof can be used and such can be administered in the form of conventional pharmaceutical preparations which contain the active ingredient or its pharmaceutically acceptable acid addition salt in admixture with conventional pharmaceutical organic or inorganic inert carrier materials suitable for enternal or parenteral administration, such as, for example, water, gelatin, lactose, starch, magnesium stearate, talc, vegetable oils, gums, polyalkylene glycols, Vaseline, and the like. The pharmaceutical preparations can be in conventional solid forms, such as tablets, dragees, suppositories, capsules and the like, or in conventional liquid forms, such as solutions, suspensions, emulsions, and the like. If necessary they can be submitted to conventional pharmaceutical expedients, such as sterilization, and/or contain pharmaceutical additive materials, such as preservatives, stabilizing agents, wetting agents, emulsifying agents, salts for adjusting osmotic pressure, and the like. They can also contain other active ingredients. The compositions containing an active ingredient of this invention can be administered orally or parenterally, with dosage adjusted to individual requirements.

The following examples are illustrative, but not limitative of the invention. All temperatures are stated in degrees centigrade.

*Example 1*

45 g. of 5 - methyl - 5-(α,α-dimethyl-3,4-dimethoxybenzyl)-hydantoin is stirred for 40 hours at 150° in an autoclave with a solution of 225 g. of barium hydroxide octahydrate in 1.2 liters of water. The barium ions are thereafter precipitated as barium sulphate by the addition of a quantity of sulphuric acid such that a small excess of barium ions is retained in the reaction mixture. The precipitate is filtered off under suction and the solution is completely de-ionized by filtration over a methacrylic carboxylic acid ion exchange column (Amberlite–IRC–50, Rohm and Haas, Washington Square, Philadelphia 5, Pa.). The aqueous solution is then evaporated in vacuo to a small volume, the resultant crystals filtered under suction and washed with a small amount of water, ethanol and ether. The so-obtained DL - α,β,β - trimethyl - β - (3,4-dimethoxy-phenyl)-alanine melts at 154–156° after recrystallization from a small amount of water. It is very readily soluble in warm water.

18 g. of DL-α,β,β-trimethyl-β-(3,4 - dimethoxy-phenyl)-alanine is boiled at reflux for 50 hours with 180 ml. of 48% hydrobromic acid. The mixture is evaporated in vacuo, the evaporation twice repeated each time with the addition of water, and the bromine irons removed from the solution by filtration over a polystyrene quaternary amonium ion exchange column (Amberlite–IRA–45. Rohm and Haas, Washington Square, Philadelphia 5. Pa.). The solution is then evaporated in vacuo almost to dryness, the residue diluted with a small amount of ethanol and the resultant crystals filtered off under suction. After washing with ethanol and ether, DL-α,β,β-trimethyl-β-(3,4-dihydroxy-phenyl)-alanine is obtained in the form of light-grey crystals which melt at 288–290° under decomposition.

The 5 - methyl-5-(α,α-dimethyl-3,4-dimethoxy-benzyl)-hydantoin used as starting material can, for example, be manufactured as follows:

167 g. of 3,4-dimethoxy-phenyl acetone is added to a solution of 19.9 g. of sodium in 650 ml. of isopropyl alcohol and, with stirring at 40–50°, added dropwise to 124 g. (54 ml.) of methyl iodide. The mixture is then stirred for 4–5 hours at room temperature, the isopropanol distilled off, the residue diluted with water and acidified with hydrochloric acid. The separated oil is then taken up in ether, the ether solution washed neutral, dried with sodium sulphate and, after removal of the ether, the residue is distilled in high vacuum. The α-methyl-α-(3,4-dimethoxy-phenyl)-acetone which is obtained distills at 110–112°/0.7 mm. Hg.

64 g. of α-methyl-α-(3,4-dimethoxy-phenyl)-acetone is added to a solution of 12.3 g. of potassium in a mixture of 107 ml. of tert-butanol and 20 ml. of toluene, and then added dropwise at 40–50° to 59 g. of methyl iodide. The mixture is further stirred overnight at room temperature and worked up as indicated in the preceding paragraph. The so-obtained α,α - dimethyl-α-(3,4-dimethoxy-phenyl)-acetone boils at 105–107°/0.06 mm. Hg.

84 g. of α,α - dimethyl - α-(3,4-dimethoxy-phenyl)-acetone, 25 g. of sodium cyanide and 330 g. of ammonium carbonate are stirred for 20 hours at 60° in a mixture of 925 ml. of water and 925 ml. of ethanol. The ethanol is distilled off in vacuo, whereupon there separates out an oil which solidifies to a crystalline state in a short time. It is filtered off under suction and washed with a large amount of ether. The so-obtained 5 - methyl - 5-(α,α-dimethyl - 3,4 - dimethoxy-benzyl)-hydantoin melts at 205–207° after recrystallization from aqueous ethanol.

Example 2

The mother liquor of the DL-α,β,β-trimethyl-β-(3,4-dimethoxy-phenyl)-alanine obtained according to Example 1 is concentrated to a heavy syrup under reduced pressure. The syrup is taken up in concentrated hydrochloric acid, and again concentrated under reduced pressure. The residue is then dissolved in warm absolute ethanol and the solution cooled. The so-obtained DL-α,β,β-tri-methyl-β-(3,4-dimethoxy-phenyl)-alanine amide hydrochloride melts at 280° under decomposition.

The hydrochloride is dissolved in water. The solution is made alkaline by the addition of sodium hydroxide solution (pH=8–8.5), yielding DL - α,β,β - trimethyl-β-(3,4-dimethoxy-phenyl)-alanine amide base which melts at 132–133°.

5 g. of this base is heated for 1 hour under reflux conditions with 50 ml. of 48% hydrobromic acid. The mixture is evaporated under reduced pressure. The foamy residue obtained is dissolved in 200 ml. of acetone. The DL-α,β,β-trimethyl-β-(3,4 - dihydroxy-phenyl) - alanine amide hydrobromide spontaneously crystallizes out from the acetone solution and melts at 239–241° under decomposition.

Example 3

25 g. of the DL-α,β,β-trimethyl-(3,4-dihydroxy-phenyl)-alanine prepared according to Example 1 is suspended in 100 ml. of absolute pyridine. 70 ml. of acetic acid anhydride are added little by little. The mixture is heated on the steam bath until all components are dissolved (about 20 minutes). The solution is then left to stand for 12 hours at room temperature and then concentrated under reduced pressure. The residue is slurried with 2 N hydrochloric acid and is filtered under suction, yielding crude 2,4-dimethyl-4-(α,α - dimethyl - 3′,4′ - diacetoxy)-benzyl-oxazolin-5-one which melts at 184–185°.

7 g. of this compound is heated on a steam bath under a nitrogen atmosphere with 14 g. of barium hydroxide octahydrate in 300 ml. of water until complete dissolution has taken place (4–5 hours). The barium is precipitated quantitatively by addition of sulfuric acid and is filtered off. The filtrate is then concentrated under reduced pressure. The DL-α,β,β-trimethyl-β-(3,4-dihydroxy-phenyl)-N-acetyl-alanine crystallizes after having been left to stand in the cold for 3 to 4 days. This compound first melts at 105–110° with the separation of water, solidifies again and finally melts at 185–190° under decomposition.

Example 4

5-methyl-5-(α,α-dimethyl-4-methoxy - benzyl) - hydantoin (melting point 215–216°) can by hydrolyzed without difficulties according to the instructions given in Example 1 to DL-α,β,β-trimethyl - β - (4-methoxy-phenyl)-alanine melting at 160–162°, and the latter compound can then be converted according to the method given in Example 1 by the action of 48% hydrobromic acid into DL-α,β,β-trimethyl-β-(4-hydroxy-phenyl)-alanine, M.P. 338–340° (dec.).

The 5-methyl-5-(α,α-dimethyl-4-methoxy-benzyl) - hydantoin used as the starting material can be prepared according to the method given in Example 1 from α-methyl-α-(4-methoxy-phenyl)-acetone, by converting the latter compound into α,α-dimethyl-α-(4-methoxy-phenyl)-acetone which can then be converted into the desired starting material.

Example 5

5.34 g. of the DL-α,β,β-trimethyl-β-(3,4-dimethoxy-phenyl)-alanine prepared according to the method given in Example 1 is added to 250 ml. of methanol. After the addition of 4 g. of sodium hydroxide and 12.4 ml. of methyl iodide, the mixture is boiled for 6 hours under reflux conditions. Small quantities of non-dissolved substances are filtered off. After standing for 12 hours in the cold, the filtrate is concentrated to dryness under reduced pressure. The residue is taken up in 300 ml. of water. The iodine is precipitated by the addition of silver oxide and it is filtered off. In order to remove the cations, the filtrate is then filtered through an Amberlite–IRC–50 column. The eluate is concentrated by evaporation under reduced pressure. The residue is taken up twice in ethanol and is evaporated. On renewed slurry of the residue with ethanol, the DL-α,β,β-trimethyl-N-methyl-β-(3,4-dimethoxy-phenyl)-alanine crystallizes out; this compound melts at 212–213°.

20 ml. of 48% hydrobromic acid is added to 0.5 g. of the compound obtained in the preceding paragraph. The mixture is boiled under reflux conditions for 1 hour. The mixture is then concentrated under reduced pressure and the syrupy residue dissolved in absolute ethanol. The pH of the solution is adjusted to about 5 by the addition of triethylamine, and the solution is then cooled. The precipitated DL-α,β,β-trimethyl-N-methyl-β-(3,4-dihydroxy-phenyl)-alanine is filtered under suction and washed with ethanol and ether. This compound melts at 280–282° under decomposition.

*Example 6*

Tablets of the following composition are prepared in the manner described below:

|  | G. |
|---|---|
| DL-α,β,β-trimethyl-β-(3,4 - dihydroxy - phenyl)-alanine | 100 |
| Lactose | 61 |
| Corn starch | 30 |
| Luviskol K 90 (polyvinylpyrrolidone) | 4 |
| Talc | 5 |
|  | 200 |

The active substance is mixed with the lactose and the corn starch and granulated with the solution of Luviskol in 40 ml. of diluted ethanol. The granules are dried at 30° and are pressed to tablets after the addition of talc.

|  | Mg. |
|---|---|
| Weight of each tablet | 200 |
| Active substance contained in each tablet | 100 |

*Example 7*

Gelatin capsules of the following composition are prepared in the manner described below:

|  | G. |
|---|---|
| DL-α,β,β-trimethyl-β-(3,4 - dihydroxy - phenyl)-alanine | 100 |
| Lactose | 155 |
| Corn starch | 30 |
| Talc | 15 |
|  | 300 |

The components are mixed homogeneously. By means of a capsule filling machine the mixture is filled into gelatin capsules.

|  | Mg. |
|---|---|
| Weight of each capsule | 300 |
| Active substance contained in each capsule | 100 |

We claim:
1. A compound selected from the group consisting of compounds of the formula

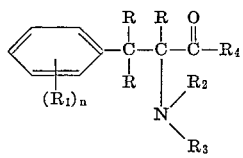

and acid addition salts thereof; wherein each R is lower alkyl of from one to three carbon atoms; $R_1$ is selected from the group consisting of hydroxy, lower alkanoyloxy and benzoyloxy; $n$ is a whole integer from 1 to 3; $R_2$ is selected from the group consisting of hydrogen, lower alkyl, lower alkanoyl and benzoyl; $R_3$ is selected from the group consisting of hydrogen and lower alkyl; and $R_4$ is selected from the group consisting of hydroxy, lower alkoxy and unsubstituted amino.

2. α,β,β-Tri(lower alkyl)-β-dihydroxyphenyl - alanine, wherein each lower alkyl group constains up to 3 carbon atoms.

3. α,β,β-Trimethyl-β-(3,4-dihydroxyphenyl)-alanine.

4. α,β,β-Trimethyl-β-(4-hydroxyphenyl)-alanine.

5. N-methyl-α,β,β-trimethyl-β-(3,4 - dihydroxyphenyl)-alanine.

6. DL-α,β,β - trimethyl-β-(3,4 - dihydroxyphenyl)-alanine.

7. A compound selected from the group consisting of compounds of the formula

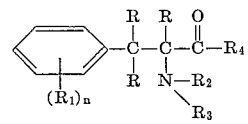

and acid addition salts thereof; wherein each R is lower alkyl of from one to three carbon atoms; $R_1$ is lower alkoxy; $n$ is a whole integer from 1 to 3; $R_2$ is selected from the group consisting of hydrogen, lower alkyl, lower alkanoyl and benzoyl; $R_3$ is selected from the group consisting of hydrogen and lower alkyl; $R_4$ is selected from the group consisting of hydroxy, lower alkoxy and unsubstituted amino.

8. α,β,β-Trimethyl-β-[3,4-di(lower alkoxy) - phenyl]-alanine.

9. α,β,β-Trimethyl-β-(3,4-dimethoxyphenyl)-alanine.

References Cited

UNITED STATES PATENTS

| 2,395,800 | 3/1946 | Boese et al. | 260—586 |
| 2,489,881 | 11/1949 | Harris et al. | 260—307 |
| 2,697,729 | 12/1954 | Ohlson et al. | 260—586 |
| 2,759,002 | 8/1956 | Close | 260—309.5 |
| 2,846,439 | 8/1958 | Joyama | 260—307 |
| 2,868,818 | 1/1959 | Pfister et al. | 260—519 |
| 2,954,399 | 9/1960 | Meltzer | 260—519 |
| 2,971,960 | 2/1961 | Waugh et al. | 260—309.5 |
| 3,023,235 | 2/1962 | Leonard | 260—519 |
| 3,046,300 | 7/1962 | Sletzinger et al. | 260—519 |

OTHER REFERENCES

Schueler et al.: Arch. Intern. Pharmacodynamie, vol. 86, pp. 91–9 (1951).

LORRAINE A. WEINBERGER, *Primary Examiner.*

HENRY R. JILES, *Examiner.*

R. GALLAGHER, L. A. THAXTON,
*Assistant Examiners.*